United States Patent
Restle

Patent Number: 5,870,264
Date of Patent: Feb. 9, 1999

[54] METHOD AND ARRANGEMENT FOR SIGNIFICANTLY INCREASING THE LIFETIME OF MAGNETIC DISK STORAGE DEVICES

[76] Inventor: Wilfried Restle, Ziegelhüttenweg 1-3, 60598 Frankfurt, Germany

[21] Appl. No.: 885,772

[22] Filed: Jun. 30, 1997

Related U.S. Application Data

[60] Continuation of Ser. No. 584,356, Jan. 11, 1996, abandoned, which is a division of Ser. No. 300,654, Sep. 6, 1994, abandoned.

[30] Foreign Application Priority Data

Sep. 6, 1993 [DE] Germany .......................... 43 30 051.0

[51] Int. Cl.$^6$ .............................. G11B 5/82; G11B 5/60; G11B 21/02
[52] U.S. Cl. ............................ 360/135; 360/75; 360/102
[58] Field of Search ..................... 360/135, 103, 360/105, 106, 102, 75, 78.04

[56] References Cited

U.S. PATENT DOCUMENTS

| | | | |
|---|---|---|---|
| 3,849,800 | 11/1974 | Cuzner et al. | 360/97 |
| 4,034,411 | 7/1977 | Kraemer et al. | 360/98 |
| 4,190,411 | 2/1980 | Fujimoto | 425/434 |
| 4,285,018 | 8/1981 | Mulvany et al. | 360/98 |
| 4,384,311 | 5/1983 | McNeil | 360/128 |
| 4,445,188 | 4/1984 | Barrett | 360/75 |
| 4,692,832 | 9/1987 | Bandara et al. | 360/137 |
| 4,795,981 | 1/1989 | Ertingshausen et al. | 360/103 |
| 4,907,106 | 3/1990 | Yamada | 360/75 |

(List continued on next page.)

FOREIGN PATENT DOCUMENTS

| | | |
|---|---|---|
| 0294761 | 6/1988 | European Pat. Off. |
| 0308527 | 3/1989 | European Pat. Off. |
| 3102608 | 5/1989 | Japan. |
| 1-302530 | 12/1989 | Japan. |
| 2103774 | 4/1990 | Japan. |
| 3132980 | 6/1991 | Japan. |
| 4143974 | 5/1992 | Japan. |
| 4-172616 | 6/1992 | Japan. |
| 5-217159 | 8/1993 | Japan. |

OTHER PUBLICATIONS

Copy of newspaper article Elect. News. Jun. 12, 1989 "Oil Slick Mires IBM Drives".
European Data Storage Interface and Technology Conference III, Sep. 25, 1991.
European Data Storage Interface and Technology Conference III, Sep. 26, 1991.

*Primary Examiner*—David L. Ometz
*Attorney, Agent, or Firm*—Sughrue, Mion, Zinn, Macpeak & Seas, PLLC

[57] ABSTRACT

The invention permits extension or elimination of the flying edge on disk surfaces of data storage devices with rotating disks to stabilize the gliding behavior of the read/write heads. The method and arrangement in accordance with the invention are advantageous above all for encapsulated rigid disk storage devices, which are generally known by the name "Winchester", and primarily also for such devices whose heads (4) touch the disk surface (3) and/or where the heads (4) perform lubricant distribution functions and remain on the disk surface (3) in rest condition. In order to obtain stable gliding conditions, the flying edge (9) is displaced beyond the electronic limits of the positioning unit (5) for the heads (4) up to the maximum mechanical limits during operation by wiping or conditioning of the disk surface using the read/write heads in certain cycles or at certain time intervals. In addition, further displacement beyond the mechanical limits is achieved by elastic restoring elements (12, 12'; 13, 13'). The flying edge extension or elimination performed means that the rail edge of the head (4) forming the flying edge does not come to rest against a flying edge (9) even at standstill. One-sided creeping-in of lubricant material at standstill is thus not possible.

1 Claim, 4 Drawing Sheets

U.S. PATENT DOCUMENTS

| | | | |
|---|---|---|---|
| 4,918,556 | 4/1990 | Ezaki et al. | 360/103 |
| 4,961,121 | 10/1990 | Astheimer et al. | 360/103 |
| 4,987,502 | 1/1991 | Freeze | 360/75 |
| 5,170,300 | 12/1992 | Stefansky | 360/105 |
| 5,172,287 | 12/1992 | Ishida | 360/105 |
| 5,184,263 | 2/1993 | Fukakusa et al. | 360/103 |
| 5,218,496 | 6/1993 | Kaczeus | 360/106 |
| 5,446,606 | 8/1995 | Brunner et al. | 360/75 |

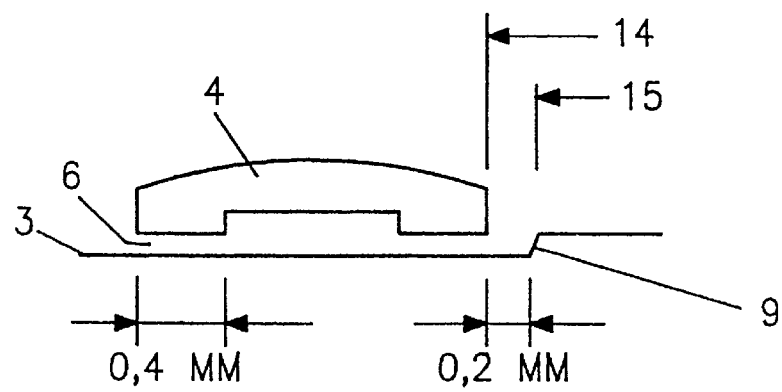
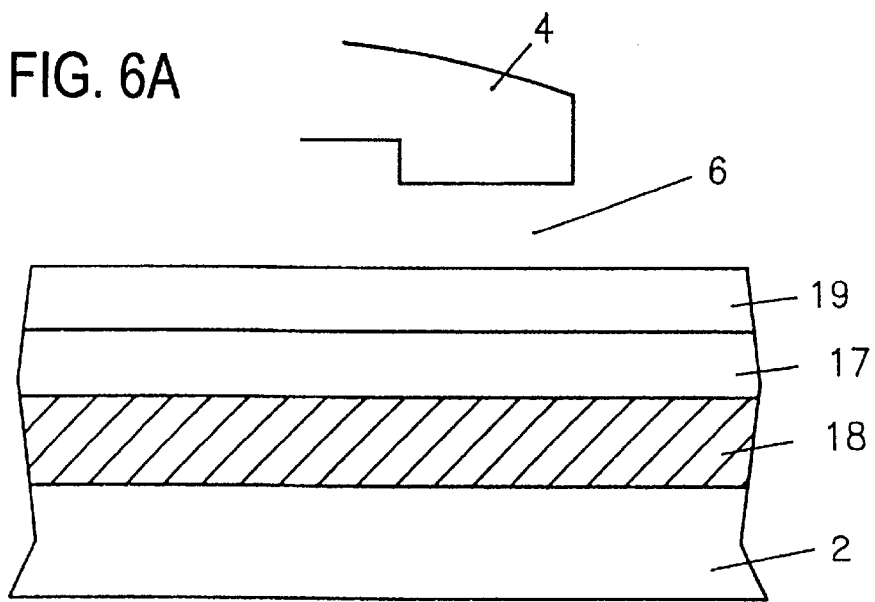
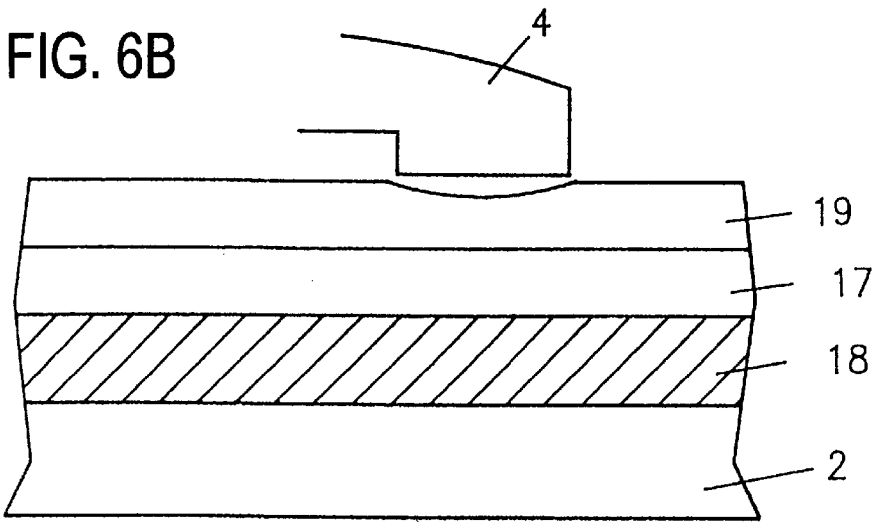

METHOD AND ARRANGEMENT FOR SIGNIFICANTLY INCREASING THE LIFETIME OF MAGNETIC DISK STORAGE DEVICES

This is a Continuation of application Ser. No. 08/584,356 filed Jan. 11, 1996, abandoned, which is a Division of Application Ser. No. 08/300,654 filed sep. 6, 1994, abandoned.

BACKGROUND OF THE INVENTION

The present invention is directed to an arrangement for significantly increasing the lifetime and recording density of magnetic disk storage devices having concentric data tracks or bands, limit bands and/or landing bands or zones as well as read/write heads located on or extremely closely above the surface of at least one disk independently of the operating state.

Magnetic disk storage devices have proven their suitability for storing large quantities of data in the field of data processing over a long period of practical use. Two basic types are essentially found in use. One type is the removable disk storage device, whose magnetic recording media, the disks, can be removed by hand without problems, whereby the read/write heads with positioning unit and motor disk drive are accommodated in a housing. However, this removability necessitates, among other things, a relatively large distance between the read/write heads and the surface of the disks, with the result that the recording density and recording capacity are limited. For this reason, the rigid disk storage device has established itself more and more, whereby its disks cannot be removed, but its read/write heads can remain in certain zones between the disks irrespective of the operating state. It is thus possible to considerably simplify the mechanical construction, to fully encapsulate the disks, heads and/or motor drive or to integrate these in a housing with air filter. This has in turn resulted in a considerable reduction in the distance between the read/write head and the disk and has increased the recording density. Such a storage device is described, for example, in U.S. Pat. No. 3,849,800. An improved type of this storage device is described, for example, in U.S. Pat. No. 4,034,411. In order to improve the storage capacity by way of a higher recording density, the head distance from the recording medium was further reduced and, in addition, the track density was increased, whereby this was made possible particularly through better design of the flying heads and carriers for the heads. Such embodiments are known, for example, from U.S. Pat. No. 4,961,121 and EU-A1-0308527. These are intended above all to reduce the distance between the head and disk and prevent undesired contact with the disk surface during operation. Contact with the surface of the recording medium during operation leads to total information or data loss and also renders the storage device unusable. The fact that the economic damage caused by this is very great both for manufacturer and user is shown, among other things, by. the article "Oil slick mires IBM drives" in Electron. News Jun. 12, 1989. In addition, these topics and problems were discussed at the "EUROPEAN DATA STORAGE INTERFACE AND TECHNOLOGY CONFERENCE III" on 25th and 26th Sep. 1991, without demonstrating a practicable solution. In this context, reference should be made to the "DISK ARRAY FORUM CONF. BOOK", issued by TECHNOLOGY FORUMS LTD., 15612 Highway 7, Suite 210, Minnetonka, Minn. 55345, USA. Gene E. Milligan of Seagate Technology Inc., in SESSION I, and Tom Glaser, IBM, "Future trends in rigid disk technology and their impact on disk arrays", Sep. 91 in SESSION VIII, discuss the problems of the low flying height of magnetic heads, the use of lubricants and the difficult process involved in contact between the head and disk during reading and recording. However, no publication shows a feasible solution, particularly with respect to avoidance of total failure due to undesired contact between the head and disk. On the contrary, only very complex methods and arrangements are suggested, as are also described in U.S. Pat. No. 4,795,981 and EU-A1-0294761; here, the magnetic head distance from the surface of the data medium is measured during operation, and reference signals are recorded, read and measured in order to prevent the destruction of data and disk and to thus also increase the lifetime of rigid disk storage devices. These methods and arrangements are technically complex and expensive, but do not solve the real problem. A method is also described in U.S. Pat. No. 4,692,832 which is intended to solve the said problem of the short operating time such that the disk storage device is slowly conditioned for continuous operation to a certain extent by running the assembly at low velocity in a dry gas atmosphere, whereby the heads fly over all tracks during a start-up time of between 1–4 minutes. Actual storage operation can commence only after this time has elapsed. Apart from the fact that these measures extend the access times, they also do not solve the real problem of increasing the lifetime by preventing destruction of the disks and/or heads.

The cause of undesired head crashes with resultant total data-loss in rigid disk units and destruction of the latter has not yet been fully clarified, since unambiguous reconstruction of the event is extremely difficult after destruction.

However, if the following observations are combined in order to create physically unambiguous conditions, it then becomes possible to master head crashes on the disk, particularly on the data tracks.

The following observations have been made in tests and studies over the course of many years:

A. "Flown-over" surfaces of exchangeable disks are shiny, "non-flown-over" surfaces are dull. However, at least 16000 running hours (2 years) are necessary before this effect can be observed; this is one of the reasons why this effect has not drawn attention to itself.

B. Collections of dirt can be found on the head after continuous operation on one track.

C. Sticking of the heads on the surface of the disk at standstill depends very greatly on the temperature and air humidity in the head/surface area. The lubricant on the disk surface also has a significant influence here.

D. Undesired and destructive contact between the head and disk, i.e. CRASHES, mainly occurs on track 0 or the landing zone.

The following conclusions have been drawn by inclusion of the observations made in A in the overall considerations:

1. If the flown-over disk=shiny surface and non-flown-over disk=dull surface, there must be a contamination pressure against the surface of the disk which is influenced by the read/write head and which produces a "flying edge" during operation.

2. This conclusion can be transferred from the exchangeable disk to the rigid disk, although clean room conditions exist here through encapsulation and built-in filters.

3. The "flown-over" surface of the disk is clearly defined in physical terms and the read/write head must encounter optimum, that is to say identical or uniform, gliding conditions.

SUMMARY OF THE INVENTION

It is the object of the invention to provide a method and arrangement which effectively increases the recording density and lifetime of magnetic disk storage devices, essentially by extending or eliminating flying edges and/or creating identical or uniform gliding conditions on the flown-over, non-flown-over or swept-over surface of the disks, without a complex mechanical or control system.

Furthermore, it is the object of the invention to provide constant physical gliding conditions for the read/write heads of rigid disks on all reachable disk surfaces and to guarantee this above all in continuous operation, that is to say to also include disk surfaces in continuous operation which are normally covered only during the switch-on or switch-off process, such as landing zones.

Flying edge extension (FEE) establishes for the first time constant gliding conditions of the read/write heads with respect to the surface of the disks during all operating conditions of the disk storage device, that is to say the slider rails of the read/write heads always encounter the same conditions, irrespective of whether in gliding/contact operation, starting/landing operation or in rest condition on the landing zone.

Flying edge extension is indispensible for future constructions where it is necessary to work with contact recording (gliding height of 2 micro-inches), since new liquid lubricants must be used which have to be distributed uniformly on the surface by the heads. When using a lubricant with a correspondingly high viscosity, the optimum cycle duration will probably be 60 seconds. The process of flying edge extension also eliminates the need for special treatment of the landing zone surface. This is an advantage which is of great significance for inexpensive production. In accordance with the invention, the heads can now land directly in the middle of the data surface, because the heads always encounter the same gliding conditions on every zone or area of the disk. In such a case, periodic travel over the surface within the electronic limits is sufficient, since the inventive theory is the n fully preserved.

In order to create definite physical conditions, the aforesaid four physical behavior patterns are related to each other below.

Starting and landing of the heads on the middle of the data surface is most favorable due to the gliding conditions and the reduction in the access time of the disk storage device.

As a result of the invention, any floating or existing abrasion material and lubricant is worked into the surface of the disk, that is to say the surface conditioning effect of continuous operation is extended over surfaces which are not normally flown over; the landing zone (hopping zone) and limit zones are brought up to data surface status, so that the heads do not encounter different gliding conditions. This combination, used here for the first time, uses the process of surface conditioning to achieve homogenous gliding behavior of the heads in all positions, zones or areas which can be reached by the latter. To explain this: if a drop of oil were allowed to evaporate inside the disk (clean room/closed) without the methods or arrangements in accordance with the invention, then the deposit would be found primarily on surfaces which are not flown over after a certain time. Gliding of the heads over this during switch-off and starting will then cause gliding stability problems, which in turn lead to a head/surface collision. Thanks to the invention, the drop of oil is uniformly distributed on all surfaces with around 100-fold reduction and thus poses absolutely no danger to gliding of the threads. The above-mentioned oil droplet must, however, be imagined as a mixture of extremely fine dust (less than 0.1 micrometer), solvent residue from seals, oil vapor from the ball bearings located inside the unit, moisture from the air in contact with the outside world and much more. Also, the starting/landing operation always involves production of extremely fine magnetic dust. Part of this is bound in the internal closed-circuit filter, while the rest is distributed everywhere, also on the disk surfaces.

The methods and arrangements in accordance with the invention can be seen as the decisive breakthrough in utilization of the surface conditioning effect and represent an inherently closed system. It is equally effective both for new deliveries and in long-term operating behavior. The service life of rigid disk storage devices in particular is increased as a result by many times, and the savings are considerable.

BRIEF DESCRIPTION OF THE DRAWINGS

The invention will now be described in greater detail in the following description in accordance with the drawings in which embodiments are shown and in which:

FIG. 5 Shows details of the relation between the flying edge/head;

FIG. 6a Shows details of the air lubrication between the head and disk;

FIG. 6b Shows details of contact writing and reading.

DETAILED DESCRIPTION OF THE INVENTION

Figure 1:
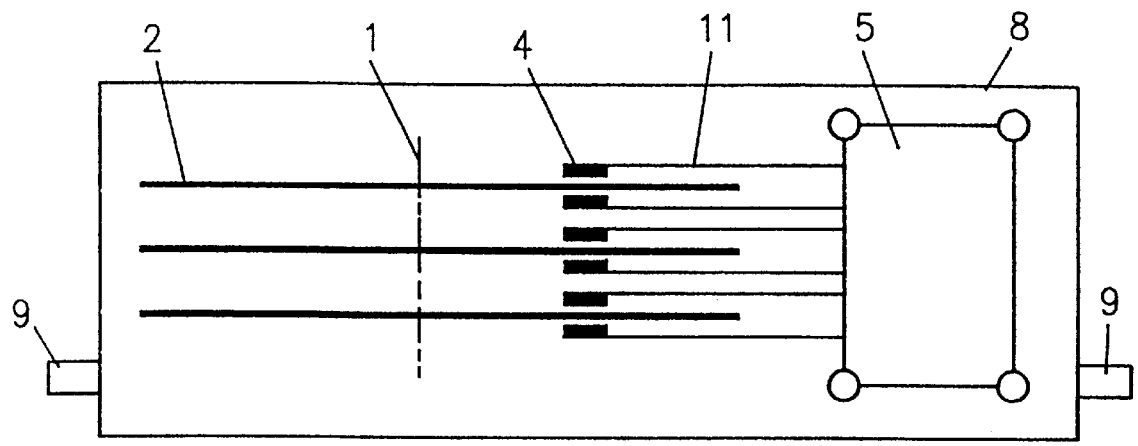
FIG. 1 Schematically shows the design of a rigid disk storage device.

A rigid disk storage device in accordance with FIG. 1 basically consists of a spindle 1, on which the disks or magnetic recording media 2 are mounted. The read/write heads 4 are located between the disks 2, these being held and moved to the desired position by a positioning system 5. The said components are encapsulated by means of a housing 8 and are operated under clean room conditions. The air inlet and/or exit ports 9 for pressure changes are therefore equipped with corresponding filters. The drive motor for the disk shaft or spindle 1 is not drawn, because it is of no significance for the invention.

Figure 2A:
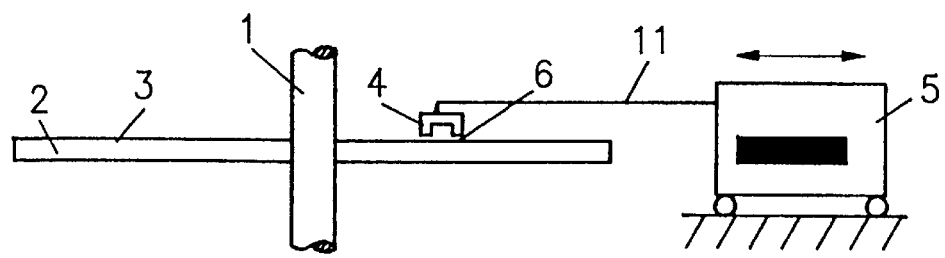
FIGS. 2a and 2b Show a disk with read/write head and positioning device in front and top views.
Figure 2B:
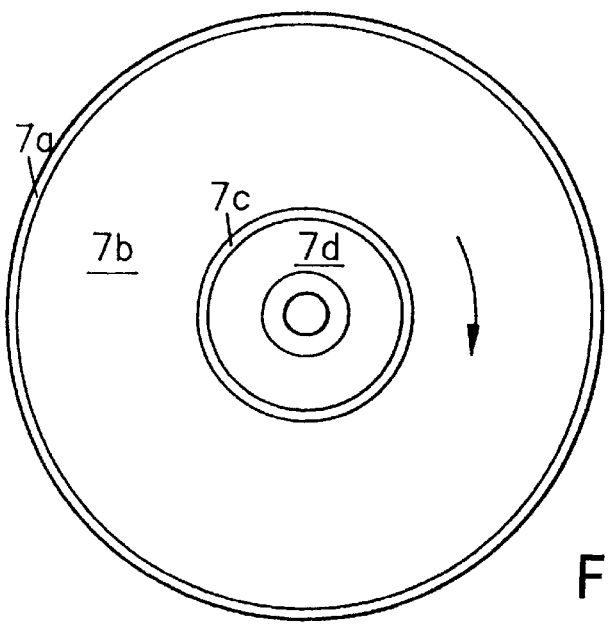

FIG. 2a shows at the top a magnetic storage disk 2, referred to below as disk, in a front view. This is driven via the spindle 1, with which it is frictionally connected. The surface 3 of the disk 2 is the magnetizable recording layer, which may be provided with a suitable lubricant. The read/write head 4 with the actual slider glides or flies over the surface 3. Between said slider and the surface 3 there is an air gap 6, which must be as small as possible, because this crucially determines the recording density. The read/write heads are connected with a positioning system 5, which positions them in a controlled manner. The top view in FIG. 2b shows four circular bands, namely an outer limit band 7a, a data band 7b with 0–n data tracks, an inner limit band 7c and a landing zone band 7d. A distinction is made between the following four operating states 6a–6d during operation:

6a The read/write head 4 rests on the surface 3 in the landing position 7d at standstill.

6b After starting, the read/write head 4 slides over the surface 3 of the landing area 7d in contact with said surface.

6c Take-off of the read/write head 4 as a result of the creation of an air cushion between the head 4 and the surface 3 of the disk 2.

6d Full development of the air cushion and thus of the air gap 6 of approximately 0.2 micrometers between the head 4 and surface 3 of the disk 2.

The mode of operation shown in simplified form in FIGS. 2a and 2b is as follows:

At standstill, the head is located in the landing zone 7d by the positioning system 5. The heads 4 rest on the disk surface 3. The spindle 1 with disk 2 is set in rotation. The head 4 glides in contact with the surface 3 of the landing zone 7d through the operating states 6b and 6c and reaches the operating state 6d when the nominal spinning speed of the disk is reached, whereby the air cushion 6 is then fully developed. The head is then moved from 7d to the data band 7b and kept in track 0. The machine is now ready for operation.

In the past, the head was able to move only between track 0 and the maximum track n in continuous operation, since the limit bands 7c inside and 7a outside electronically prevented movement beyond these by the positioning system 5.

Consequently, the surface conditioning effect was restricted during operation to data band 7b only. The bands 7d, 7c and 7a were subject to the contamination pressure of the internal air medium, while the data band 7b was conditioned by the head 4 running over it, and deposits were more or less uniformly distributed by the head 4 on the very large surface of data band 7b.

The operating state "continuous operation" at track 0 led to increased failures due to collection of dirt on the head, while periodic movement of the head(s) 4 from track 0 to maximum track n and back to track 0 or movement within the data band 7b measurably improved the situation, but did not have any influence at all on the bands 7d, 7c and 7a.

The switch-off operation moves the head 4 from the data band 7b to the landing zone band 7d, while the decreasing rotational speed of the spindle 1 reduces the surface velocity under the head 4, so that the gap/cushion 6 passes through operating states 6d to 6a.

This operating sequence clearly demonstrates that the bands 7d, 7c and 7a were in fact excluded from the head conditioning effect in the past and were not flown over.

The suggested method and arrangement extend for the first time this surface conditioning effect to the bands 7d, 7c and 7a, so that the head 4 for the first time encounters constant gliding conditions over the whole surface area 7a, 7b, 7c and 7d of a disk 2.

The landing zone 7d demonstrates a further special relationship between the head 4 and magnetizable surface 3. The surfaces of the head 4 and of the disk 2 are extremely plane surfaces, this being the precondition for the low flying height of the head or slider. Even a very small oil film results in stiction of the head 4 on the surface 3 at standstill. This greatly feared effect necessarily leads to destruction of the surface 3 and/or of the head 4 when the disk 2 is started. If we now assume that the disk 2 would fail after one month due to a stiction crash with a non-flown-over landing zone, then failure can be expected only after 100 months (around 8 years) in the case of a flown-over landing zone where the oil film concentration is reduced 100-fold. This relationship also serves as proof for the above-mentioned statement that the safest landing zone is actually in the middle of the data band.

Since this method is applicable to all magnetic disk storage devices, which can thus be made practically immune to undesired head crashes, the advantages offered by it are very great, particularly if we remember that a head crash leads to total data loss with all its technical, logistical and financial consequences.

In technological terms, the same effect can be achieved if the landing zone band 7d is moved to the middle of the data band 7b, because the head 4 encounters constant gliding conditions in all the areas accessible to it in this configuration as well(limited by 7c and 7a).

The behavior of the read/write heads 4 with respect to the surface 3 of the disk 2 under specific conditions occurring in practical operation will now be described in more detail with reference to FIGS. 3a–3g. The electronic limits are designated by A–B, the mechanical limits of the positioning system by C–D and the mechanical limits of the spring elements or restoring elements of the head 4 by E–F. These limits will be explained exactly later on with reference to FIG. 5. The line 1 serves merely to symbolize the disk spindle 1. The disks 2 themselves are also drawn only symbolically. In FIGS. 3a–3g, it is possible to see the read/write head 4 between the electronic limits A–B of the positioning system at the inner limit band 7c over the data band 7b during operation. As a result of the electronic limits A–B, the inner and outer flying edges 9 are formed by deposits over the course of time. The data band 7b, as the flown-over surface, can be assumed to have identical flying and/or gliding conditions. In contrast, the landing and limit bands 7d and 7a, c are defined as non-flown-over surfaces and the surface here has undefined and varying characteristics. The flown-over surfaces are shiny or smooth after a long period of operation, while the non-flown-over surfaces are dull or rougher, as has been established by detailed long-term studies. Consequently, the surface of the disk 2 is subject to a contamination pressure which is influenced by the read/write head 4 and which produces the flying edges 9 in the form of deposits during operation of conventional disk storage devices. Extremely fine deposits are also to be found on landing zone 7d and the limit bands 7a and 7c.

Figure 3A:
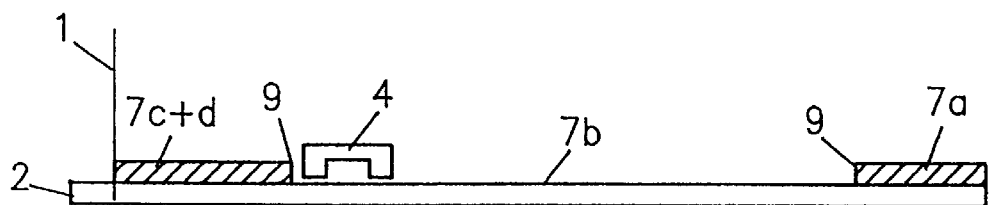
FIGS. 3a–3g Show a spindle with disks under different conditions.
Figure 3B:
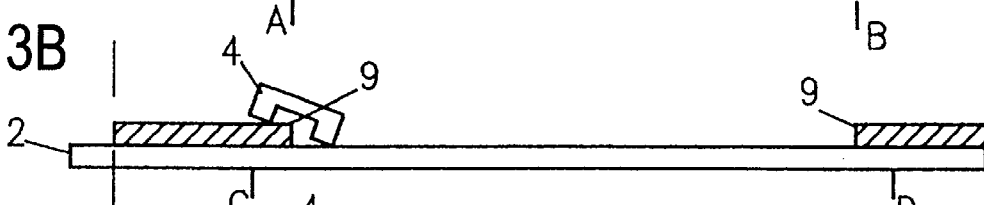

FIG. 3b illustrates a read/write head 4 at standstill, with one rail landed on the limit band 7c and the other on the data band 7b, whereby the flying edge 9 means that the head has non-uniform and inclined contact, and it is also located on surfaces with different surface conditions. The gliding conditions during starting and build-up of the air cushion are therefore poor and lead, sooner or later, to destruction of the head 4 and/or surfaces 7b to 7d of the disk 2.

Figure 3C:

In FIG. 3c, the head 4 is located at standstill on the non-flown-over landing band 7d or limit band 7c. Here too, the conditions for starting and build-up of the air cushion are poor due to the different surface conditions of the flown-over or non-flown-over bands or zones and thus lead to the described consequences.

Figure 3D:
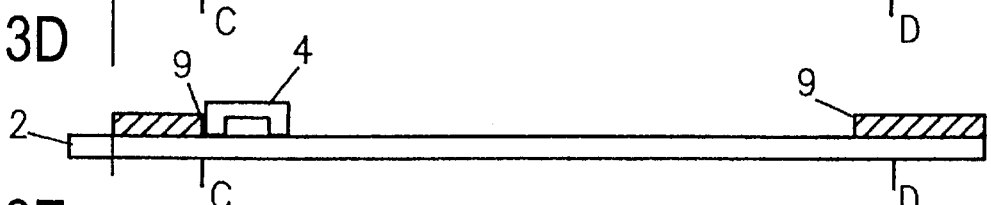

In FIG. 3d, the head 4 has landed on the extended flown-over zone or band. The inner flying edge has been extended and the landing and data bands 7c+d or 7b thus have the same surface conditions, and head tilting no longer occurs.

Figure 3E:
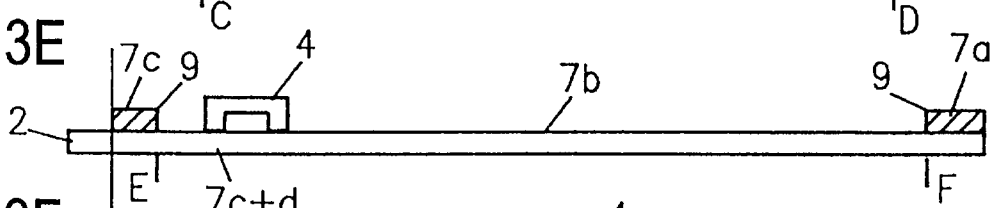

In FIG. 3e, the head 4 can be seen at standstill on the landing band 7d or limit band 7c with the flying edges 9 extended to the maximum extent; the data band is widened here and flown-over conditions exist everywhere, that is to say the head 4 is located on the conditioned surfaces 7c and 7d.

The surface conditioning effect is the result of the mutual influence of surfaces of high surface quality which are moved at a high relative speed and which are kept apart by an air cushion (lubrication).

Figure 3F:
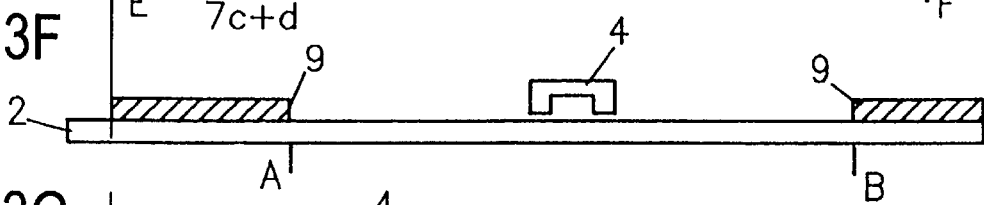

In FIG. 3f, the head 4 is at standstill and has landed in the middle of the data band 7b; this is advantageous as regards reduction of the access time, since it is necessary to travel over only half the data band width at most to position the head 4 and optimum gliding and flying conditions exist (track 0 in the center).

Figure 3G:
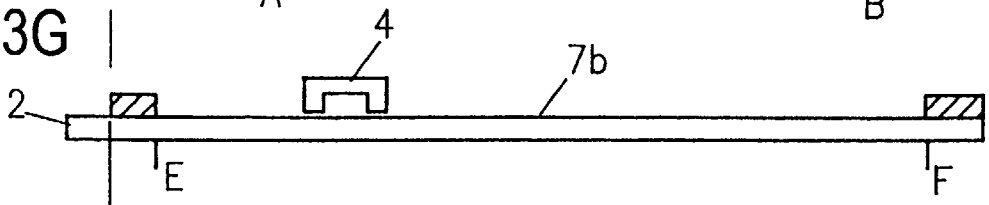

FIG. 3g shows the head 4 in operation, and the range of the data surface or data band 7b corresponds here to the maximum possible mechanical distance. The landing zone, also such a zone in the center, has been dispensed with here. The head 4 is always over data tracks or the data band. The flying edge 9 is eliminated in the flown-over band, area or surface. A non-flown-over surface or landing band is no longer required.

Figure 4A:
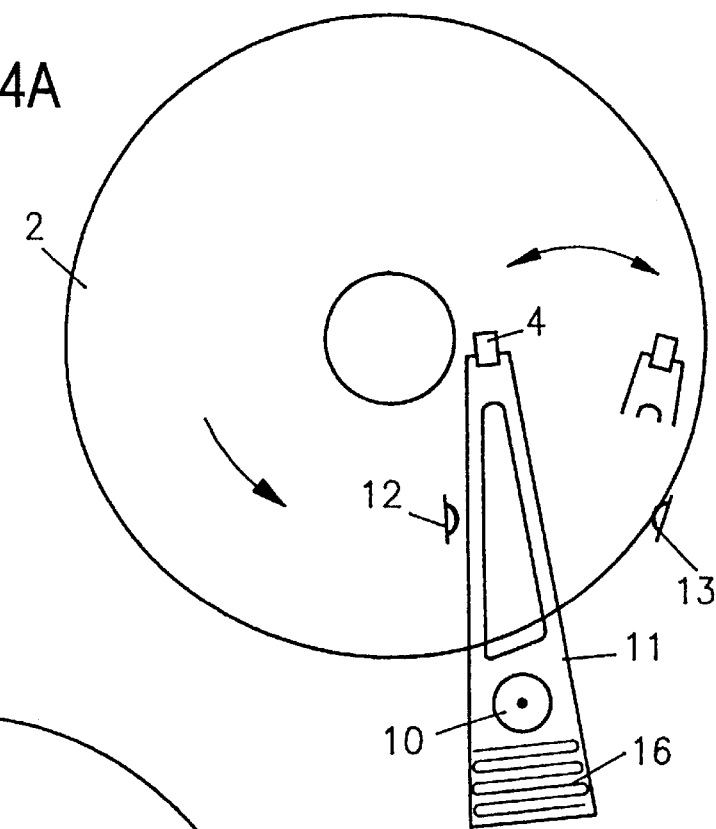
FIG. 4a Shows a disk storage device with rotatable positioning mechanisms.
Figure 4B:
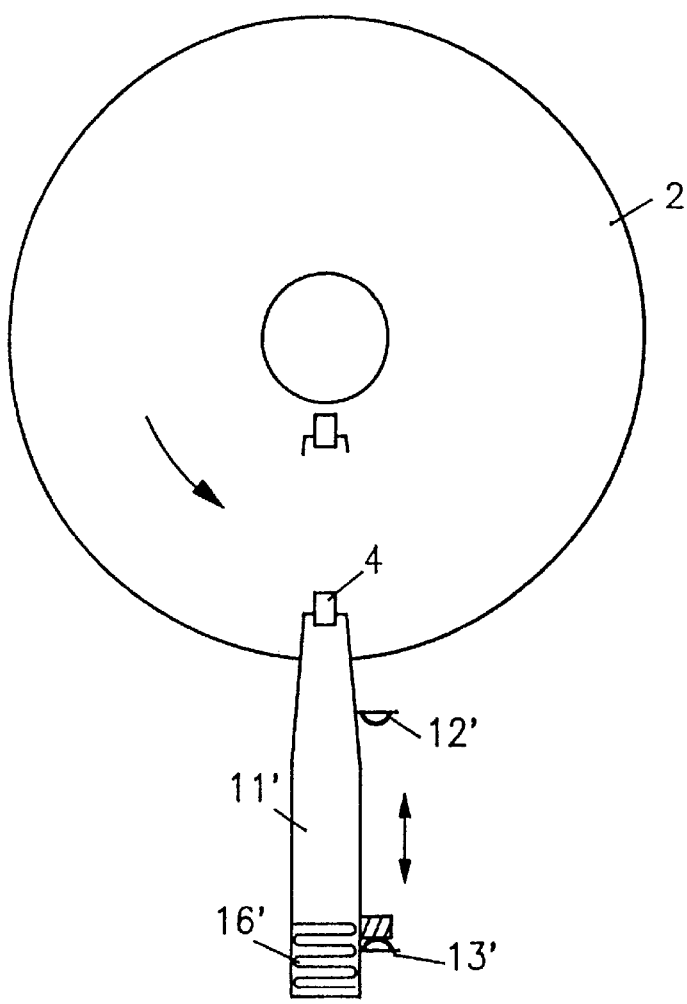
FIG. 4b Shows a disk storage device with linear positioning mechanism.

The mechanical limits of the head 4 will now be demonstrated for different disk storage device constructions with reference to FIGS. 4a and 4b.

FIG. 4a shows a known rigid disk storage device with an arm 11 capable of positioning about a pivot point 10. The arm 11 is moved to the desired position by means of known plunger coils, stepping motors 16 or similar. The head 4 is located at the front of the arm 11, whereby the mechanical limits C–D or E–F of the former in accordance with FIG. 3 are defined or determined by the inner limiters 12 and outer limiters 13. FIG. 4b illustrates a linear/radial construction of the arm 11' with head 4. The inner and outer limiters 12' and 13' define in turn the mechanical limits C–D or E–F of the head movements on the disk 2. The arm 11' is driven and moved to position by means of known stepping motors, plunger coils 16' or similar here as well.

It will now be shown briefly with reference to a commercially available 3.5" rigid disk storage device and FIG. 5 how the surface conditioning cycle affects the length of the travel distance of the head 4 over the disk 2 and the required time. For this purpose, FIG. 5 shows a head 4 with a rail width of $\frac{1}{64}$" and a minimum distance of $\frac{1}{128}$" between the head 4 and the extended flying edge 9 on the disk surface 3. The upper arrow 14 represents the mechanical limit of the positioning mechanism at standstill and the lower arrow 15 the mechanical limit of the depressed spring element of the inner and outer limiters 12, 12'; 13, 13' in accordance with FIGS. 4.1 and 4.2. The conditioning cycle, for example, takes place when the spring element is depressed. Example calculation:

$$1" = 25.4 \text{ mm}$$

$$\frac{\text{Travel distance}}{\text{Rail width of a head}} = \frac{25.4 \text{ mm}}{63.5 \text{ revs.}}$$

Consequently, 63.5 revolutions are necessary to travel over the surface without gaps. This is equivalent to around 800 ms at 5400 rpm=90 rps. The mechanical stops are located inside and outside on both sides (arrows 14 and 15), and an additional time of 2×50 ms is required in the case of depressed spring elements 12, 12'; 13, 13'. The flying edge 9 is unambiguously statically defined by around 5 revolutions at the stop. These values must be adapted corresponding to the geometric conditions for 2.5", 1.8" and 1.3" drives.

In order to achieve even higher bit and track densities, that is to say more data on the disk surface, it is necessary to bring the head 4 even closer to the magnetic layer 18.

If improvement of the lubricant 19 permits long contact gliding, the next step is permanent contact gliding on the lubricant, that is to say the air cushion 6 is replaced by lubricant. It is therefore necessary to succeed in sweeping over or better "surfing over" the lubricant 19 in order to keep the frictional heat caused by the direct contact between the lubricant and head to a minimum.

Contact gliding results in constant extremely fine abrasion (lubricant vapor with suspended particles with a size of around 500 Å), which places a load on the internal atmosphere of the rigid disk. However, the heads work this contamination into the disk surface again, that is to say into the lubricant, so that an equilibrium is very quickly achieved in this cycle. This equilibrium can be achieved and maintained by the methods and arrangements described here, since there is no starting and landing on a "non-surfed" surface. The head 4 is now responsible for uniform distribution of the lubricant and guarantees that no whirling of dirt can occur over and beyond the constant abrasion by way of a clearly defined "surfed" starting/landing zone. These relationships are clearly shown by FIG. 6a for an air cushion and lubricant between the head 4 and disk 2 and by FIG. 6b for contact reading/writing without an air cushion.

The invention permits extension or elimination of the flying edge on disk surfaces of data storage devices with rotating disks to stabilize the gliding behavior of the read/write heads. The method and arrangement in accordance with the invention are advantageous above all for encapsulated rigid disk storage devices, which are generally known by the name "Winchester", and primarily also for such devices whose heads 4 touch the disk surface 3 and/or where the heads perform lubricant distribution functions and remain on the disk surface 3 in rest condition. In order to obtain stable gliding conditions, the flying edge 9 is displaced beyond the electronic limits of the positioning unit 5 for the heads 4 up to the maximum mechanical limits during operation by wiping or conditioning of the disk surface using the read/write heads in certain cycles or at certain time intervals. In addition, further displacement beyond the inner and outer mechanical limits is achieved by elastic spring or restoring elements 12, 12'; 13, 13'.

The flying edge extension or elimination performed means that the rail edge of the head 4 forming the flying edge does not come to rest against a flying edge 9 even at standstill. One-sided creeping-in of lubricant material at standstill is thus not possible.

One solution for the method is that, time-controlled by a microprogram, the read/write heads 4 fly, wipe or sweep one or more times over all tracks, zones, areas or bands 7 located within the maximum limits E–F of the positioning unit 5 on the disk surface immediately after or during the starting phase of the magnetic disk storage device and/or between read/write cycles, and that said disk surface 3 is uniformly conditioned or prepared during this step, and another solution is that, time-controlled by an electronic time control, the read/write heads 4 fly, wipe or sweep over all tracks, zones, areas or bands 7 within the maximum limits E–F of the positioning unit 5 on the disk surface 3 immediately after or during the starting phase of the magnetic disk storage device and/or after a specific number of read/write cycles, and that during this step said disk surface 3 is uniformly conditioned or prepared. The read/write heads 4 eliminate or extend the flying edges 9 by periodic flying over, wiping or sweeping over the disk surface 3 within the mechanical and electronic limits A–B, C–D, E–F.

The data band 7b is widened by time-controlled periodic flying over, wiping or sweeping over of all existing tracks, zones, areas or bands 7a–d, whereby time-controlled flying over, wiping or sweeping over can be priority-controlled. Time-controlled flying over, wiping or sweeping over can also occur independently of the read/write cycles or read/write operations of the magnetic disk storage device.

The arrangement to significantly increase the lifetime and recording density of magnetic disk storage devices, particularly rigid disk storage devices is essentially such that the flying edges 9 formed on the disk surface 3 by deposits during operation are located outside the mechanical limits E–F of the positioning unit 5 for the read/write heads 4 and that flown-over and non-flown-over tracks, bands, zones or areas 7a–7d have a uniform and practically identical surface condition or structure. A lubricant 19 is located above a protective layer 17 for the magnetic layer 18 of a disk 2, whereby said lubricant contains extremely fine abrasion particles distributed and worked in by the read/write heads 4 and is distributed uniformly by the method in accordance with the invention and worked into the protective or magnetic layer as necessary. An air cushion and/or a lubricant 19 is located between the read/write heads 4 and protective layer 17. The read/write head 4 rests on the middle recording tracks, which are realized as a data and/or landing track, zone or area, while in rest condition.

The landing and limit bands, zones, areas or tracks can also be used as recording tracks, and the read/write heads 4 can now be located directly on or above the data tracks 7b in wait or rest condition.

I claim:

1. A system for significantly increasing the operational lifetime of encapsulated magnetic disk storage devices comprising:

at least one rigid disk having concentric data tracks and landing zones, disk drive means for driving said at least one disk, at least one read/write head disposed in close proximity to a surface of said at least one disk independently of an operating state, and positioning means for moving said at least one read/write head between mechanical limits relative to said at least one disk, one of said mechanical limits being disposed outside an outer diameter of said data tracks and landing zones, wherein during operation under nominal RPM of a spindle of said disk drive mean the periodically positioned across said data tracks and landing zones to maintain substantially uniform identical surface conditions between said mechanical limits, and wherein, during operation under the nominal RPM of said spindle, flying edges formed by deposits on the disk surface between the data tracks and the landing zones of said at least one disk are located outside said mechanical limits for said at least one read/write head.

* * * * *